(12) United States Patent
Niu

(10) Patent No.: US 8,648,278 B2
(45) Date of Patent: Feb. 11, 2014

(54) PROCESS FOR PRODUCING SUBSTRATE PROVIDED WITH METAL PATTERN AND SUBSTRATE PROVIDED WITH METAL LAMINATE

(75) Inventor: Guangyao Niu, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 305 days.

(21) Appl. No.: 13/082,799

(22) Filed: Apr. 8, 2011

(65) Prior Publication Data

US 2011/0249340 A1    Oct. 13, 2011

(30) Foreign Application Priority Data

Apr. 8, 2010    (JP) ................................. 2010-089595

(51) Int. Cl.
*B23K 26/00* (2006.01)

(52) U.S. Cl.
USPC .................................. 219/121.68; 219/121.69

(58) Field of Classification Search
USPC .............. 313/567–643; 345/60–72; 216/24; 219/121.6–121.86; 359/566–576, 359/580–590; 428/660
See application file for complete search history.

(56) References Cited

U.S. PATENT DOCUMENTS

| 5,104,480 | A | * | 4/1992 | Wojnarowski et al. | 216/65 |
| 5,221,426 | A | * | 6/1993 | Tessier et al. | 216/65 |
| 5,589,280 | A | * | 12/1996 | Gibbons et al. | 428/626 |
| 2010/0073764 | A1 | * | 3/2010 | Kai et al. | 359/359 |

FOREIGN PATENT DOCUMENTS

| JP | 2001-52602 | 2/2001 |
| JP | 2005-108668 | 4/2005 |

* cited by examiner

*Primary Examiner* — Stephone B Allen
*Assistant Examiner* — Kimberly N Kakalec
(74) *Attorney, Agent, or Firm* — Oblon, Spivak, McClelland, Maier & Neustadt, L.L.P.

(57) ABSTRACT

The present invention relates to a process for producing a substrate provided with a metal pattern by forming a pattern of a metal layer on a substrate using a laser light, the process including: a step of preparing a substrate in which the metal layer is formed on a surface thereof; a step of forming on the metal layer an assist layer which comprises a metal material different from that of the metal layer and which has a light absorptivity for the laser light different from that of the metal layer, thereby forming a metal laminate on the substrate; and a step of patterning the metal layer by irradiating the metal laminate with the laser light to remove a laser light-irradiated portion of the metal laminate, thereby forming a metal pattern on the substrate.

15 Claims, 12 Drawing Sheets

Fig. 16

PROCESS FOR PRODUCING SUBSTRATE PROVIDED WITH METAL PATTERN AND SUBSTRATE PROVIDED WITH METAL LAMINATE

FIELD OF THE INVENTION

The present invention relates to a process for producing a substrate provided with a metal pattern, in which a metal pattern is formed by using a laser light, and relates to a substrate provided with a metal laminate.

BACKGROUND OF THE INVENTION

As a process for producing display panel for flat panel display such as plasma display panel, there has been known a technique of providing a thin film for a transparent electrode on a glass substrate, and irradiating the thin film for transparent electrode with a laser beam to conduct patterning, thus forming a transparent electrode (see, for example, patent documents 1 and 2). According to such processing method utilizing laser beam, the number of production steps can be decreased in comparison with the photo lithography steps and, further, necessity of preparing a large-sized photo mask is eliminated. Still further, the production line is made more compact, which serves to reduce the land area necessary for the process, thus the step number being decreased and the process being stabilized.

Patent document 1: JP-A-2001-52602
Patent document 2: JP-A-2005-108668

SUMMARY OF THE INVENTION

By the way, in recent years, ITO (Indium Tin Oxide) has widely been used as a material for transparent electrode but, in view of the risk of exhaustion of indium and reduction of production cost of flat panel displays, there has been made an attempt to form a display panel for flat panel display by using a metal for ordinary wiring without using the transparent electrode. In such cases, processing of forming an electrode by patterning a metal film for wiring formed on a glass substrate becomes necessary. For example, with conventional plasma display panels in which silver is used for a bus electrode on a transparent electrode, there can be considered a processing method of forming an electrode by patterning silver through irradiation with a laser light.

However, application of the processing method using a laser light described in patent document 1 or 2 as such to processing of a metal film involves a problem that processing of the metal film is difficult. Specifically, there has been the problem that, although the region of laser beam which shows high thermal absorption efficiency for a metal film to be processed is an ultraviolet ray region, it is difficult to obtain a high-output laser light in the ultraviolet ray region. On the other hand, when YAG layer of 1064 nm in wavelength is used in order to obtain a high laser output, absorption of energy by the metal film is so small that there has been involved a problem that processing is difficult unless the laser power is increased to a considerably high level. For example, there has been the problem that, when the thickness of the metal film becomes 1 μm or more, processing thereof cannot be conducted with high accuracy even when the power of laser light is increased to 400 W or more.

Thus, an object of the invention is to provide a process for producing a substrate provided with a metal pattern which permits processing to form a metal pattern using a laser light and which is applicable to flat panel displays such as plasma display panels, and a substrate provided with a metal laminate.

In order to attain the above-described object, the present invention relates to the following items (1) to (14).

(1) A process for producing a substrate provided with a metal pattern by forming a pattern of a metal layer on a substrate using a laser light, said process comprising:
a step of preparing a substrate in which the metal layer is formed on a surface thereof;
a step of forming on the metal layer an assist layer which comprises a metal material different from that of the metal layer and which has a light absorptivity for the laser light different from that of the metal layer, thereby forming a metal laminate on the substrate; and
a step of patterning the metal layer by irradiating the metal laminate with the laser light to remove a laser light-irradiated portion of the metal laminate, thereby forming a metal pattern on the substrate.

Thus, the absorption amount of the laser light absorbed by the whole laminate is increased by using the assist layer which has a light absorptivity for the laser light different from that of the metal layer, which facilitates processing for forming the metal pattern.

(2) The process for producing a substrate provided with a metal pattern according to (1), wherein the assist layer has a higher light absorptivity for the laser light than that of the metal layer.

Thus, laser light energy absorption of the laminate is enhanced, whereby the metal layer can be evaporated together with the assist layer, and thus a metal pattern can be formed on a substrate with high accuracy.

(3) The process for producing a substrate provided with a metal pattern according to (1) or (2), wherein the assist layer is formed with a thickness smaller than that of the metal layer.

Thus, the amount of light energy absorbed by the thick metal layer can be increased only by forming the thin assist layer and laser processing can be facilitated.

(4) The process for producing a substrate provided with a metal pattern according to (3), wherein the metal material contains 80 atom % or more of copper, aluminum or molybdenum.

Thus, a substrate provided with a metal pattern can be produced at a low production cost using a wiring material which is commonly used as a wiring material and which is easily available.

(5) The process for producing a substrate provided with a metal pattern according to any one of (1) to (4), wherein the assist layer contains at least one element selected from the group consisting of chromium, cobalt, zirconium, tin, titanium, iron, molybdenum and nickel.

Thus, it is possible to form a laminate which can enhance laser light energy absorption by selecting an appropriate assist layer according to the compatibility with various materials to be used for the metal layer.

(6) The process for producing a substrate provided with a metal pattern according to any one of (1) to (5), wherein the laser light has a wavelength of from 320 to 1070 nm.

Thus, a substrate provided with a metal pattern can be produced using, for example, YAG laser fundamental wave, and a substrate provided with a metal pattern with high accuracy can be produced using a highly controllable laser apparatus.

(7) The process for producing a substrate provided with a metal pattern according to any one of (1) to (6), wherein the laser light has an energy density of from 0.3 to 10 J/cm$^2$.

Thus, a substrate provided with a metal pattern can be produced using a low-energy laser light, with production cost being reduced.

(8) The process for producing a substrate provided with a metal pattern according to any one of (1) to (7), wherein the metal layer has a thickness of from 0.1 to 10 μm.

Thus, a substrate provided with a metal pattern with high accuracy can be produced even when the thickness of the metal layer is more than micron order.

(9) The process for producing a substrate provided with a metal pattern according to any one of (1) to (8), wherein the assist layer has a thickness of from 5 to 200 nm.

Thus, energy supply to the metal layer can be enhanced only by forming the assist layer having an extremely small thickness in comparison with the thickness of the metal layer, which serves to facilitate laser processing.

(10) The process for producing a substrate provided with a metal pattern according to any one of (1) to (9), wherein the substrate is a glass substrate.

Thus, a substrate provided with a metal pattern which can be utilized for a flat display panel such as a plasma display panel or a liquid crystal panel can be produced.

(11) The process for producing a substrate provided with a metal pattern according to any one of (1) to (10), wherein a low-reflective layer capable of reducing reflection of light toward the substrate side is formed between the substrate and the metal layer.

Thus, a substrate provided with a metal pattern which can prevent reflection of light toward the metal pattern-formed side can be produced.

(12) The process for producing a substrate provided with a metal pattern according to any one of (1) to (11), wherein the assist layer is left on the metal layer as a protective layer for the metal layer.

Thus, in the case of using, for example, a metal material such as copper which requires a protective layer for the metal layer, the assist layer can be utilized as it is as the protective layer, whereby a substrate provided with a metal pattern can be produced with high reliability in a small number of steps.

(13) The process for producing a substrate provided with a metal pattern according to any one of (1) to (11), which further includes a step of removing the assist layer after patterning the metal layer.

Thus, in the case of using, for example, a metal material such as aluminum which does not require a protective layer, a substrate with a thinner metal pattern can be produced by removing the assist layer after completion of the processing with laser light.

(14) A substrate provided with a metal laminate, comprising:
a substrate;
a low-reflective layer formed on the substrate and capable of reducing reflection;
a metal layer formed on the low-reflective layer, containing 80 atom % or more of copper, aluminum or molybdenum, and having a thickness of from 0.1 to 10 μm; and an assist layer formed on the metal layer, comprising a metal material different from that of the metal layer, having a higher light absorptivity for a laser light having a wavelength of from 320 to 1070 nm than that of the metal layer, and having a thickness of from 5 to 200 nm.

Thus, a substrate which facilitates processing of the metal layer and the assist layer can be produced, and a desired metal pattern can be formed with ease by using a laser light.

According to the present invention, a substrate on which a metal pattern is formed with high accuracy can be produced.

BRIEF DESCRIPTION OF THE DRAWINGS

FIG. 6(a) shows one example of the surface of a substrate in the assist layer-forming step. FIG. 6(b) shows one example of the surface of a substrate in the laser-processing step.

FIG. 9(a) is a plane view of the substrate 10. FIG. 9(b) is a cross-sectional view showing enlarged portion A in FIG. 9(a).

In FIG. 15, items (a) to (h) show the results of Example 1 to 8, respectively.

FIG. 16 shows an example of the results of conducting the process of producing a substrate provided with a metal pattern in accordance with the embodiment 2. In FIG. 16, items (a) to (f) show the results of Example 9 to 14, respectively.

FIG. 19(a)

is a partial enlarged cross-sectional view of the front panel 130. FIG. 19(*b*) is a partial enlarged plane view of the front panel 130.

FIG. 20(*a*) shows one example of a cross-sectional view of a front panel 131. FIG. 20(*b*) shows one example of a plane view of a front panel 131.

DETAILED DESCRIPTION OF THE INVENTION

An embodiment for performing the present invention is described hereinafter by reference to the drawings.

Embodiment 1

FIGS. 1 to 7 show one example of respective steps of the process for producing a substrate provided with a metal pattern in accordance with embodiment 1.

Figure 1:
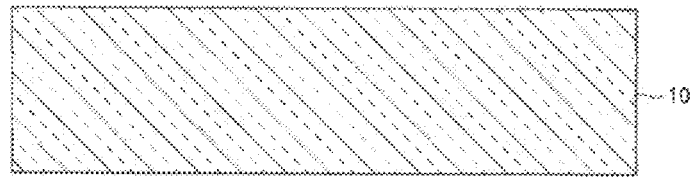
FIG. 1 shows one example of the step of preparing a substrate 10 in the process for producing a substrate provided with a metal pattern in accordance with an embodiment 1.

FIG. 1 shows one example of a step of preparing a substrate 10 in the process for producing a substrate provided with a metal pattern in accordance with this embodiment. In FIG. 1, a substrate 10 is shown to be prepared in a mounted state. As the substrate 10, substrates of various materials can be used. For example, a glass substrate 10 is preferably used. The glass substrate 10 is used in many cases as a display panel material of a flat panel display such as a plasma display panel or a liquid crystal panel. In this embodiment, description is made by reference to an example in which a glass substrate is used as the substrate 10. However, various substrates 10 may be used as long as they have resistance to heat to be generated upon laser processing and to laser irradiation thereupon.

Figure 2:
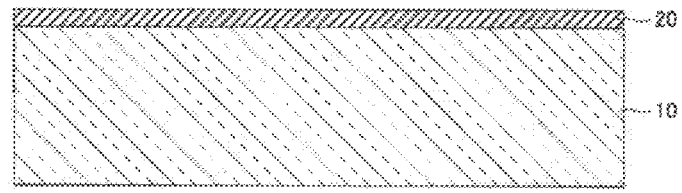
FIG. 2 shows one example of the low-reflective layer-forming step in the process for producing a substrate provided with a metal pattern in accordance with the embodiment 1.

FIG. 2 shows one example of a low-reflective layer-forming step in the process for producing a substrate provided with a metal pattern in accordance with this embodiment. In the low-reflective layer-forming step, a low-reflective layer 20 is formed on the surface of the substrate 10. The low-reflective layer 20 is a layer which, in the case of using a completed substrate provided with a metal pattern is used in, for example, a flat panel display, functions so that incident light entering from the side of the substrate 10 is not reflected. Therefore, the low-reflective layer 20 comprises a material which does not reflect light but absorbs light. The low-reflecting function of the low-reflective layer 20 may be based on absorption of light utilizing, for example, optical interference.

The low-reflective layer 20 may comprise, for example, a metal oxide (a metal oxide film). As the metal oxide, oxides of various metals can be applied and, for example, it may be a metal oxide film of molybdenum or chromium. In this case, the metal oxide may be represented by, for example, $Mo_xO_y$ or $Cr_xO_y$ (x, y>0). Also, the metal oxide is preferably determined in consideration of adaptability for a metal layer to be successively formed on the low-reflective layer 20.

Additionally, the low-reflective layer 20 may be formed by various methods. For example, it may be formed as a thin film on the surface of the substrate 10 by sputtering method. Also, as to the thickness of the low-reflective layer, various thickness values may be employed according to the use. For example, the layer is constituted in a thickness of preferably from 3 nm to 10 nm.

Figure 3:
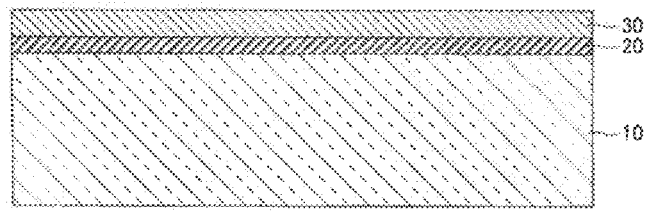
FIG. 3 shows one example of the metal layer-forming step in the process for producing a substrate provided with a metal pattern in accordance with the embodiment 1.

FIG. 3 shows one example of a metal layer-forming step in the process for producing a substrate provided with a metal pattern in accordance with this embodiment. In the metal layer-forming step, a metal layer 30 is formed on the low-reflective layer 20. Various metal materials may be used for the metal layer 30. For example, a metal material for using in wiring is preferred. Thus, in general, metal materials commonly used for wiring, such as copper (Cu), aluminum (Al), titanium (Ti), molybdenum (Mo), chromium (Cr), and silver (Ag) are used for the metal layer 30. In the invention, use of copper (Cu), aluminum (Al), and molybdenum (Mo) is preferred due to their low resistance and inexpensiveness. Also, the metal layer 30 may be constituted as a single-component metal or as an alloy containing 80 atom % or more of one of these metals. Thus, it becomes possible, for example, to form an electrode or a wiring layer utilizing the metal layer 30. In particular, in the case where the substrate provided with a metal pattern is used as a front substrate of a plasma display panel, a scan electrode or a sustain electrode can be constituted by the metal layer 30.

The thickness of the metal layer 30 may be varied depending upon use and is preferably in the range of from, for example, 0.1 μm to 10 μm, more preferably from 0.1 μm to 5 μm. Because, in the case where the metal layer is utilized as an electrode or a wiring layer, it is necessary to satisfy the requirement for given sheet resistance level according to each use. That is, since the metal layer 30 having a larger thickness provides a smaller sheet resistance, there exists the case where a micron-order level film thickness is necessary in order to satisfy the requirement for given sheet resistance level of an electrode or a wiring layer. For example, in the case of using the metal layer 30 as a scan electrode or as a sustain electrode of a front substrate of a plasma display panel, the sheet resistance is required to be 0.01 Ω/□ or less. This sheet resistance criteria of 0.01 Ω/□ or less can be satisfied when the metal layer 30 is made of copper and has a thickness of 3 μm or more or when the metal layer is made of aluminum and has a thickness of 5 μm or more. On the other hand, with a gate wiring to be used for liquid crystal thin film transistor (TFT), Al or an alloy thereof is used in a film thickness of from 0.1 to 0.3 μm. There is a trend to use Cu in the future. Therefore, the thickness of the metal layer 30 may be determined according to the kind of a metal material used for the metal layer 30 and use of the substrate provided with a metal pattern, and is, for example, determined in the range of preferably from 0.1 μm to 10 μm.

Additionally, the metal layer 30 may be formed by various methods, for example, sputtering method.

Also, in this embodiment, FIG. 1 through FIG. 3 show a step of producing a substrate provided with a metal pattern by forming, in turn, the low-reflective layer 20 and the metal layer 30 on the substrate 10. However, it is also possible to initiate the process for producing a substrate provided with a metal pattern in accordance with this embodiment from the step shown by FIG. 3. For example, in the case where the substrate 10 having on the surface thereof the low-reflective layer 20 and the metal layer 30 is available, it may be possible to conduct patterning of the metal layer 30 from this stage to produce the substrate 10 provided with a metal pattern. Regarding the steps shown by FIG. 1 through FIG. 3, it suffices that the substrate 10 having on the surface thereof the metal layer is finally prepared, and the preceding steps shown by FIG. 1 and FIG. 2 for preparing the substrate 10 having thereon the metal layer 30 may be conducted as needed.

Figure 4:
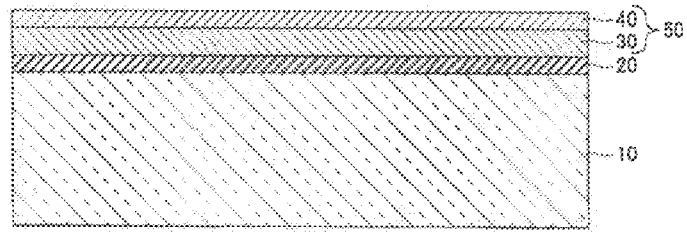
FIG. 4 shows one example of the assist layer-forming step in the process for producing a substrate provided with a metal pattern in accordance with the embodiment 1.

FIG. 4 shows one example of an assist layer-forming step in the process for producing a substrate provided with a metal pattern in accordance with this embodiment. In FIG. 4, an assist layer 40 is formed on the metal layer 30. The assist layer 40 comprises a metal material different in kind from the metal layer 30. Therefore, the assist layer 40 is different from the metal layer 30 in light absorption properties. With the metal layer 30 having such a low light absorptivity that, when directly irradiated with a laser light, it fails to absorb enough amount of the laser light to evaporate, formation of the assist layer 40 serves to transmit enough amount of the laser light to the metal layer 30, leading to removal of the film.

Also, the thickness of the metal layer 30 varies according to use thereof and, for example, the thickness is as large as 1 μm or more when the thickness is large, whereas the assist layer 40 may have a smaller thickness of the metal layer 30. The assist layer 40 is preferably constituted so that its thickness becomes from 5 nm (=50 Å) to 200 nm (=2,000 Å), more preferably from 5 nm (=50 Å) to 50 nm (=500 Å). In the assist layer-forming step, the assist layer 40 is formed on the metal layer 30 to form a laminate 50 composed of the metal layer 30 and the assist layer 40 on the substrate 10.

Various metals can be used for the assist layer 40. For example, the assist layer 40 preferably contains one or more elements selected from the group consisting of chromium (Cr), cobalt (Co), zirconium (Zr), tin (Sn), titanium (Ti), iron (Fe), molybdenum (Mo) and nickel (Ni). In particular, use of chromium (Cr), cobalt (Co), or molybdenum (Mo) is more preferred. Of these metals, a metal material which, when formed on the metal layer 30 to form the laminate 50, can transmit energy from laser light with high efficiency to the underlying metal layer 30 is selected for the assist layer 40. Thus, it becomes possible to conduct laser processing of the metal layer 30 with a smaller laser power than in laser processing of the metal layer 30 in a single layer without formation of the assist layer 40.

Also, it is preferred to select a metal material for the assist layer 40 so that laser processing can be conducted with a smaller laser power by constituting the laminate 50 together with the metal layer 30 than in laser processing of the assist layer 40 in a single layer. For example, when chromium is selected as a material for the assist layer 40 for the metal layer 30 made of copper, the whole laminate 50 can be processed with a laser light having a smaller energy than in the case of laser processing of a single layer composed of copper or chromium.

As such combination, various combinations can be considered other than the combination that copper and chromium are used for the metal layer 30 and the assist layer 40, respectively. For example, in the case where aluminum is used for the metal layer 30 and chromium, cobalt, or molybdenum is used for the assist layer 40, the whole laminate 50 exhibits the effect of enhancing absorption of laser light energy in comparison with the case where the metals are individually used in a single layer state.

Thus, in the assist layer-forming step, it is preferred to select, as the assist layer 40, an assist layer which enhances laser light energy absorption and which enables processing with a laser light having a smaller energy when in a laminate 50 than in the case of processing the metal layer 30 and the assist layer 40 as a single layer, respectively.

The assist layer 40 preferably comprises a metal material having a higher melting point and a higher boiling point than that for the metal layer 30. It may be considered that, when the assist layer 40 has a higher melting point and a higher boiling point than that of the metal layer 30, evaporation of the assist layer 40 is difficult upon irradiation thereof with laser light but, when the metal layer 30 is easy to evaporate, evaporation of the assist layer 40 can be accelerated due to the influence of the evaporation action of the metal layer 30. And, it may also be considered that, when the metal layer 30 having a lower melting point and a lower boiling point than that of the assist layer 40 is combined with the assist layer 40 to form the laminate 50, the assist layer 40 itself also becomes more easy to evaporate with laser light in the state of the laminate 50 than in a single film state, thus use of smaller laser powder being permitted.

Also, as long as the laser light energy for laser processing of the laminate 50 having the assist layer 40 can be made smaller than in the case of laser processing of the metal layer 30 alone, the assist layer 40 may be a single layer film or a film constituted by plural layers.

Additionally, formation of the assist layer 40 may be conducted according to various methods, and may be formed by, for example, sputtering method.

Also, the substrate in the state shown in FIG. 4 is referred to as a substrate provided with a metal laminate composed of a metal layer 30 and an assist layer 40. The substrate provided with the metal laminate is a substrate which facilitates processing with laser light, and is a substrate which can exhibit effects as a substrate for laser processing.

Figure 5:
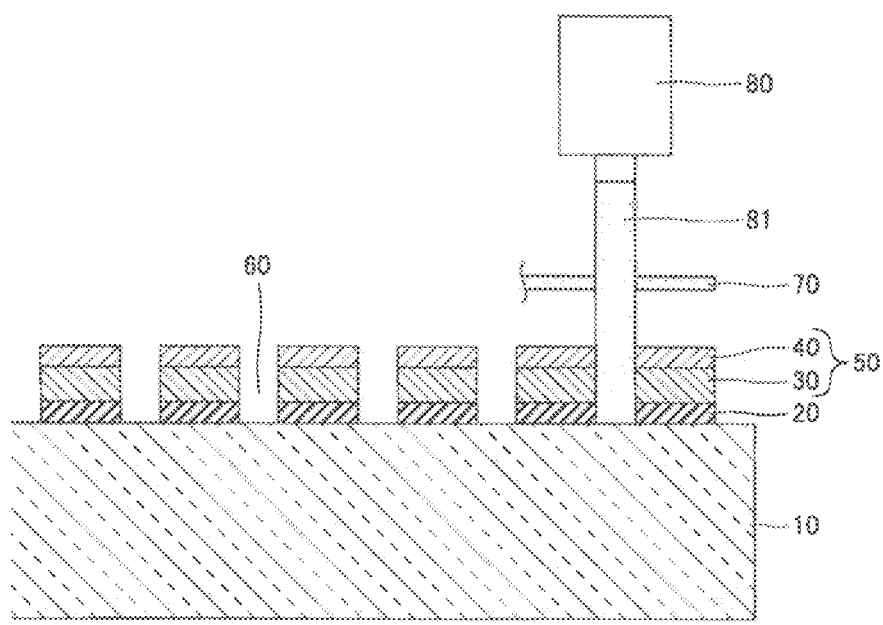
FIG. 5 shows one example of the laser-processing step in the process for producing a substrate provided with a metal pattern in accordance with the embodiment 1.

FIG. 5 shows one example of a laser-processing step in the process for producing a substrate provided with a metal pattern in accordance with this embodiment. In the laser-processing step, the surface of the assist layer 40 is irradiated with laser light 81 to remove the laminate 50 and the low reflective layer 20 in the laser-irradiated portions. As is shown in FIG. 5, the portions irradiated with laser light 81 constitute removed portions 60, whereby unnecessary portions of the metal layer 30 are removed to form a pattern. As is described above, in a state of the laminate 50 in which the assist layer 40 is formed on the metal layer 30, absorptivity of the surface layer for the laser light 81 is enhanced so that energy is transmitted from the surface layer of the assist layer 40 to the underlying metal layer 30 with high efficiency, thus the underlying metal layer 30 being vaporized by heat and being evaporated together with the surface assist layer 40, leading to removal of the laminate 50. In this occasion, the energy of laser light 81 can be a small energy and, at the same time, patterning can be conducted with high accuracy with leaving less residue.

As is shown in FIG. 5, laser processing is conducted using a mask 70, and laser light 81 is irradiated to the laminate 50 so as to draw a predetermined pattern. The laser light 81 is generated from a laser light source 80 and is irradiated to the laminate 50.

It suffices for the laser light 81 to have a laser power enough for processing of the laminate 50. For example, solid-state laser of from 320 to 1070 nm in wavelength can be employed. Additionally, in order to obtain a sufficient laser power, it is preferred to use a high-energy laser light 81 of approximately the YAG fundamental wave. As is described above, it is difficult to obtain the laser light 81 with a high energy output in the ultraviolet ray region or the like, and hence it is preferred to use a laser light 81 having a wavelength λ of approximately YAG fundamental wave, for example, in the range of from 1060 to 1070 nm. Also, higher harmonic waves of the YAG fundamental wave such as second harmonic wave or third harmonic wave of the YAG fundamental wave can also preferably be used as the laser light 81.

As the laser light 81, a laser light 81 having an energy density of, for example, from 0.3 to 10 $J/cm^2$ is preferably used. Further, the laser light 81 may be a pulse laser or a continuous irradiation laser. For example, a pulse laser of from 1 to 100 kHz in pulse repetition frequency and from 1 ns to 1 μs in pulse width is preferably used. Also, as the laser source 80, various laser light sources 80 may be used as long as they can generate and irradiate the above-described laser light 81.

As the pattern of the metal layer 30 to be formed by the laser-processing step, various patterns may be formed according to use thereof. For example, in the case where a scan electrode and a sustain electrode of a front substrate of a plasma display panel are formed by the pattern of the metal layer 30, removed portions 60 with a predetermined width may be formed with a predetermined space therebetween as is shown in FIG. 5, and the remaining laminate 50 may constitute them as a pattern of plural straight lines disposed in parallel to each other.

Figure 6A:
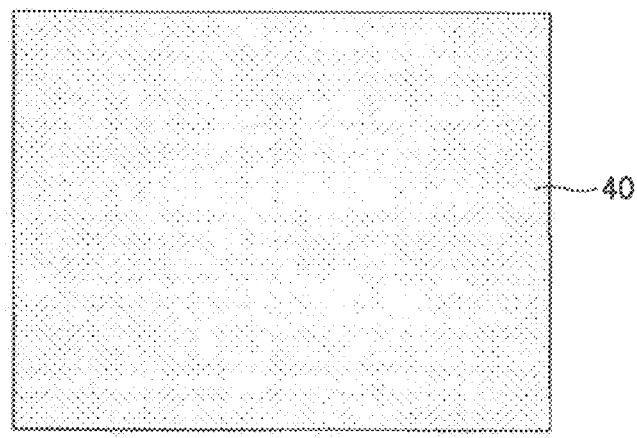
FIGS. 6(a) and 6(b) are plane views showing one example of the surface of a substrate in the assist layer-forming step and in the laser-processing step.
Figure 6B:
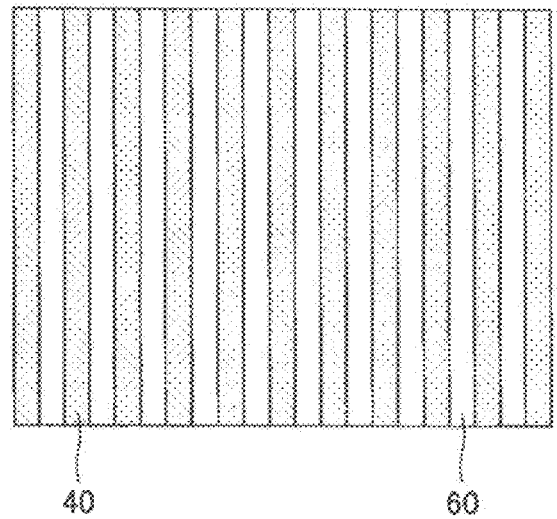

FIG. 6 are plane views showing one example of the surface of a substrate in the assist layer-forming step and in the laser-processing step. FIG. 6(*a*) shows one example of the surface of a substrate in the assist layer-forming step. As has been described with respect to FIG. 4, the assist layer 40 is formed as an outermost layer on the substrate 10. The assist layer 40 covers all over the surface of the substrate 10, whereby laser processing of the metal layer 30 underlying the assist layer 40 is made easily.

FIG. 6(*b*) is a plane view showing one example of the surface of a substrate in the laser-processing step. In FIG. 6(*b*), laser processing is completed to form plural removed portions 60. The substrate 10 is exposed at the removed portions 60. Also, the remaining portions of the laminate 50 composed of the assist layer 40 and the metal layer 30 are formed in parallel straight lines with the same space width as the width of the removed portions. Thus, a striped pattern is formed as a whole. As is described above, according to the process of producing a substrate provided with a metal pattern in accordance with this embodiment, various patterns including the striped pattern as shown in FIG. 6(*b*) can easily be formed by forming the assist layer 40 on the metal layer 30.

With the substrate provided with the metal pattern shown in FIG. 5, in the case where the assist layer 40 is utilized as a protective layer for the metal layer 30 and need not be removed, an after-treatment (washing) for removing remaining residues is conducted after completion of the laser-processing step, thus the step of producing the substrate provided with the metal pattern being completed. After the step of producing the substrate provided with the metal pattern in the process of producing, for example, a plasma display panel, there is provided a firing step of heating to around 600° C. In the case where the metal layer 30 is made of copper and the substrate provided with the metal pattern is to be used as a glass substrate for plasma display panel, a protective layer is necessary for protecting copper so as to prevent oxidation of copper in the firing step. Therefore, in the case of using the substrate provided with the metal pattern is used for such use, the assist layer 40 is left as formed and is utilized as a protective layer for preventing oxidation or against invasion from a dielectric.

On the other hand, in the case where the assist layer 40 is not utilized as the protective layer but is necessary to be removed, the processed substrate is transported to a subsequent assist layer-removing step.

Figure 7:
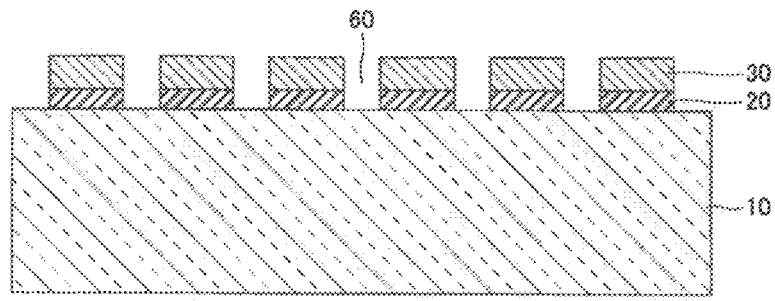
FIG. 7 shows one example of the assist layer-removing step in the process for producing a substrate provided with a metal pattern in accordance with the embodiment 1.

FIG. 7 shows one example of the assist layer-removing layer in the process for producing the substrate provided with the metal pattern in accordance with this embodiment. In FIG. 7, the assist layer 40 is removed and the metal layer 30 is exposed as the surface. For example, in the case where the metal layer 30 is made of aluminum, the protective layer is not necessary in the firing step because aluminum does not require oxidation-preventing means. In such case, there is provided an assist layer-removing step to remove the unnecessary assist layer 40.

Various methods may be employed for removal of the assist layer 40. For example, a wet etching method may be employed.

As is described above, steps in the process for producing a substrate provided with a metal pattern in accordance with this embodiment have been described using FIGS. 1 to 7. As is described by reference to particularly FIGS. 3 to 5, according to the process for producing the substrate provided with the metal pattern in accordance with this embodiment, patterning of the metal layer 30 can be conducted with high accuracy and a smaller laser power, by conducting laser processing after forming the assist layer 40 on the metal layer 30 when the substrate 10 having formed on the surface thereof the metal layer 30 is prepared.

Figure 8:
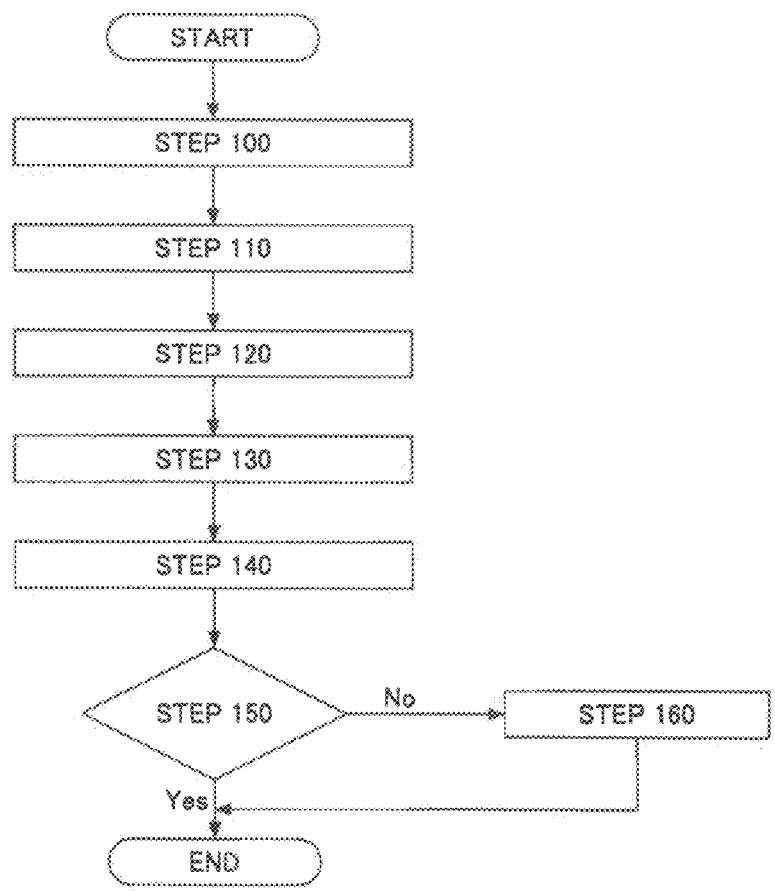
FIG. 8 shows one example of a processing flow of the process for producing a substrate provided with a metal layer in accordance with the embodiment 1.

FIG. 8 shows one example of a processing flow of the process for producing a substrate provided with a metal layer in accordance with the embodiment 1. Additionally, the same reference numbers are given to the same constituents as in the above description, with descriptions thereon being omitted.

In step 100, the low-reflective layer 20 is formed on the substrate 10. As has been described with respect to FIG. 2, the low-reflective layer capable of preventing reflection of surface reflection of light is formed on the surface of the substrate 10 by the sputtering method or the like.

In step 110, the metal layer 30 which is a main metal layer is formed on the substrate 10. The main metal layer means a target layer which is to be patterned, and corresponds to the metal layer 30. As has been described with respect to FIG. 3, the metal layer 30 is formed by using a metal material which can be patterned into an electrode, wiring layer, or the like.

In step 120, the assist layer 40 is formed on the metal layer 30. As has been described with respect to FIG. 4, the assist layer 40 is a thin metal layer which comprises a metal material different from that of the metal layer 30, which can absorb laser light with good efficiency and which, when formed on the metal layer 30, transmits energy from the laser light to the metal layer 30 with good efficiency to facilitate laser processing. After the formation of the assist layer 40, the metal laminate 50 constituted by the metal layer 30 and the assist layer 40 is formed.

In step 130, irradiation of the laminate 50 with laser light 81 is conducted to remove laser-irradiated portions of the laminate 50. As has been described with respect to FIG. 5, as the laser light 81, laser light 81 of the wavelength around YAG fundamental wave is preferably used. In addition, higher harmonic waves of the YAG fundamental wave and other solid-state lasers may widely be used. The processing of partially removing the laminate 50 can be conducted with smaller laser energy than in the case of independently irradiating the metal layer 30 and the assist layer 40 with laser light.

In step 140, after-treatment is conducted for removing residues remaining after laser processing. Specifically, the laser-processed substrate 10 is washed, whereby residues remaining in the laser-processed portions are washed away.

In step 150, it is judged whether the assist layer 40 is a protective layer or not. In the case where the assist layer 40 is necessary as a protective layer for the metal layer 30, the processing flow is ended. On the other hand, in the case where the assist layer 40 is not necessary as a protective layer, the processing flow proceeds to step 160.

In step 160, the assist layer 40 is removed. As has been described with respect to FIG. 7, the unnecessary assist layer 40 is removed by etching or the like, with the metal layer 30 exposing on the surface of the substrate 10 in a patterned state, thus the processing flow being ended.

Figure 9A:
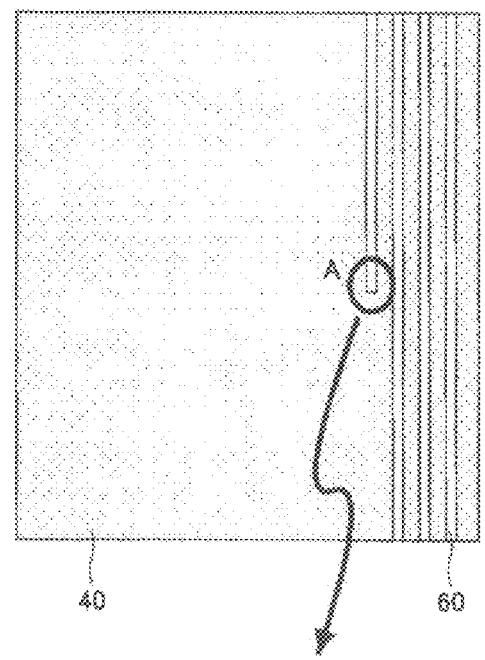
FIGS. 9(a) and 9(b) show one example of the state in the middle of the laser-processing step.

FIG. 9 show one example of the intermediate state of the laser-processing step. FIG. 9(*a*) is a plane view of the substrate 10. As is shown in FIG. 9(*a*), laser is irradiated to portions of the surface of the assist layer 40 formed all over the substrate 10 in which the metal layer 30 and the assist layer 40 are to be removed, thereby forming removed portions 60. The substrate 10 is exposed at the removed portions 60. As is shown in FIG. 9(a), a metal pattern of the metal layer 30 can be formed on the substrate 10 by laser drawing.

Figure 9B:
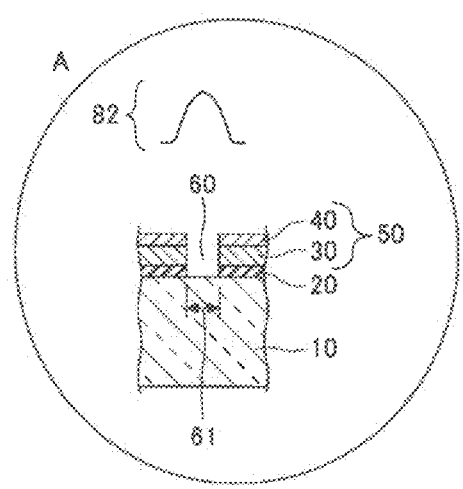

FIG. 9(b) is a cross-sectional view showing enlarged portion A in FIG. 9(a). In FIG. 9(b), the low-reflective layer 20, the metal layer 30, and the assist layer 40 are formed on the substrate 10, and removed portions 60 from which these layers are removed is shown. As is shown in FIG. 9(b), the width of the removed portions 60 is the pattern width 61. Also, an example of energy distribution 82 of the laser light 81 is shown. The energy distribution 82 of the laser light 81 should be a curve of approximately normal distribution, and the high energy region should be irradiated to the assist layer 40. Otherwise, the removed portions 60 having a vertical wall as shown in FIG. 9(b) cannot be formed, leaving residues. Therefore, as has been described with respect to FIG. 5, it is preferred to conduct irradiation with the laser light 81 using the mask 70 so that only the high energy region of the laser light 81 irradiates the assist layer 40 (mask 70 not being shown in FIG. 9). As is described above, in consideration of the energy distribution of the laser light 81, patterning of the metal layer 30 can be conducted with high accuracy and less residues, by irradiating the assist layer 40 with the laser light 81 having passed through the mask 70 and, therefore, having only a high energy zone in the energy distribution.

Embodiment 2

FIGS. 10 to 14 show one example of the process for producing a substrate provided with a metal pattern in accordance with embodiment 2.

Figure 10:
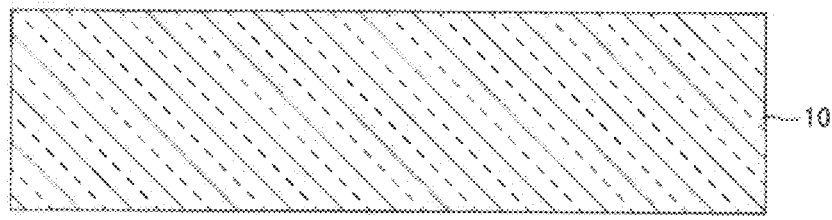
FIG. 10 shows one example of the step of preparing a substrate 10 in the process for producing a substrate provided with a metal pattern in accordance with an embodiment 2.

FIG. 10 shows one example of a step of preparing the substrate 10 in the process for producing the substrate provided with a metal pattern in accordance with embodiment 2. Since the step shown in FIG. 10 is the same as that described with respect to FIG. 1 for embodiment 1, the same reference numbers are given, with descriptions thereon being omitted.

Figure 11:
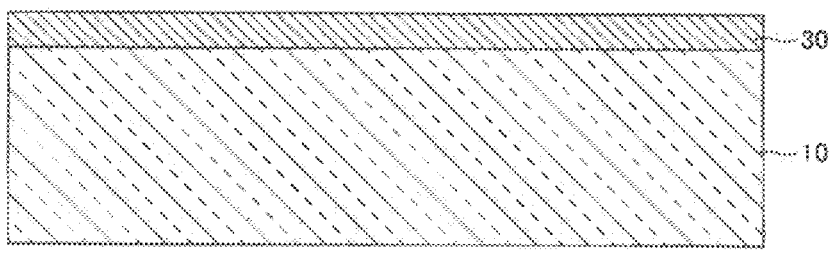
FIG. 11 shows one example of the metal layer-forming step in the process for producing a substrate provided with a metal pattern in accordance with the embodiment 2.

FIG. 11 shows one example of a metal layer-forming step in the process for producing a substrate provided with a metal pattern in accordance with embodiment 2. In the metal layer-forming step, a metal layer 30 is formed on the substrate 10. In embodiment 1, the low-reflective layer 20 is formed on the substrate 10 whereas, in the process for producing a substrate provided with a metal pattern in accordance with embodiment 2, the low-reflective layer 20 is not formed but the metal layer 30 is directly formed on the substrate 10. Thus, the two embodiments are different from each other in this point. Even in the case where the substrate provided with the metal pattern is to be used for a flat panel display such as a plasma display panel or a liquid crystal panel, it may be considered that the substrate 10 can acquire anti-reflective function by other means, for example, by forming a glass substrate material for the substrate 10 so as to possess low-reflective properties. Therefore, in such case, it is possible to provide the low-reflective layer 20 but to form the metal layer 30 directly on the substrate 10.

Additionally, the function of the metal layer 30 is the same as in embodiment 1 in that it functions as a main metal layer forming an electrode and wiring, and the material for the metal layer 40 is also the same as in the description on embodiment 1, thus descriptions thereon being omitted. Also, as the method of forming the metal layer 30, various methods of forming a metal film such as sputtering may appropriately be employed as is the same with embodiment 1. Hence, the same reference numbers as in embodiment 1 are given, with descriptions thereon being omitted.

Figure 12:
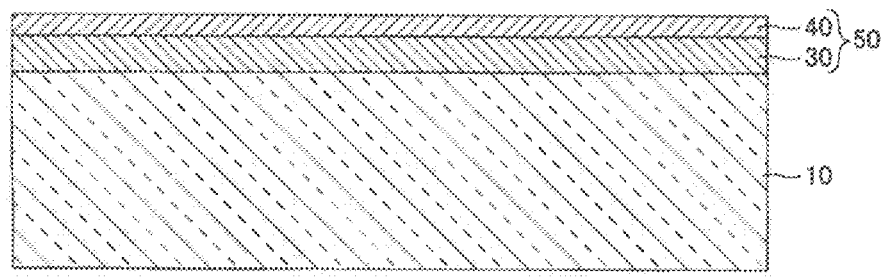
FIG. 12 shows one example of the assist layer-forming step in the process for producing a substrate provided with a metal pattern in accordance with the embodiment 2.

FIG. 12 shows one example of an assist layer-forming step in the process for producing a substrate provided with a metal pattern in accordance with embodiment 2. In FIG. 12, the assist layer 40 is formed on the metal layer 30 to form the laminate 50 composed of the metal layer 30 and the assist layer 40. In this point, this assist layer-forming step is the same as that in the assist layer-forming step in embodiment 1. As has been described with respect to FIG. 11, the assist layer-forming step in accordance with embodiment 2 is different from that in accordance with embodiment 1 only in the point that the low-reflective layer 20 does not exist between the substrate 10 and the metal layer 30 in embodiment 2.

As is described above, the assist layer 40 can be formed on the metal layer 30 regardless of the presence or absence of the low-reflective layer 20. Since function of the assist layer 40 and method of its formation are the same as that in embodiment 1, the same reference numbers are given to the same constituents, with descriptions thereon being omitted.

Figure 13:
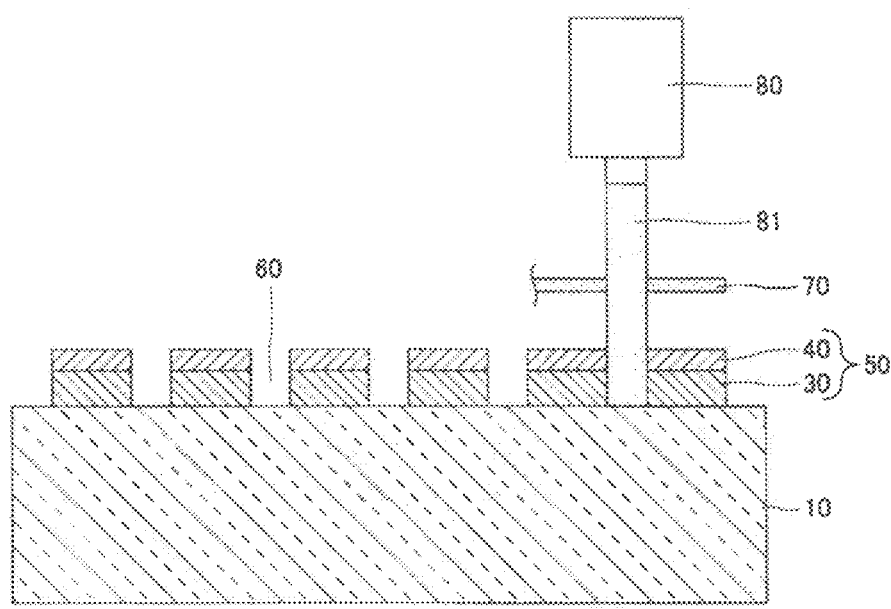
FIG. 13 shows one example of the laser-processing step in the process for producing a substrate provided with a metal pattern in accordance with the embodiment 2.

FIG. 13 shows one example of the laser-processing step in the process for producing a substrate provided with a metal pattern in accordance with embodiment 2. In FIG. 13, the laminate 50 is irradiated with the laser light 81 generated by the laser source 80 to form removed portions 60 in the laser-irradiated portions of the laminate 50. The residual portions of the metal layer 30 constitute a metal pattern.

The laser-processing step in accordance with embodiment 2 is also the same as the laser-processing step in accordance with embodiment 1 except the point that the low-reflective layer 20 does not exist between the substrate 10 and the metal layer 30. Therefore, preferred ranges of wavelength $\lambda$ of the laser light 81, energy density, pulse repetition frequency, and pulse width are also the same as in the laser-processing step in accordance with embodiment 1. Since the laminate 50 itself has the same constitution as in embodiment 1, patterning of the metal layer 30 is possible with a small laser power as is the same as in embodiment 1. Therefore, the same reference numbers are given to the same constituents, with descriptions thereon being omitted.

Figure 14:
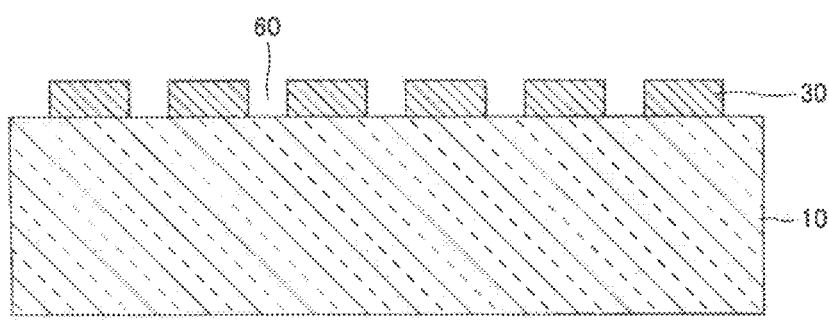
FIG. 14 shows one example of the assist layer-removing step in the process for producing a substrate provided with a metal pattern in accordance with the embodiment 2.

FIG. 14 shows one example of an assist layer-removing step in the process for producing a substrate provided with a metal pattern in accordance with embodiment 2. Also, in embodiment 2, in the case where the assist layer 40 is not necessary as a protective layer, the assist layer 40 is removed. On the other hand, in the case where the assist layer 40 is necessary as a protective layer, the assist layer 40 is left, and the assist layer-removing step is not necessary. The assist layer-removing step is also the same as in embodiment 1 except the point that the low-reflective layer 20 does not exist between the substrate 10 and the metal layer 30. Therefore, the same reference numbers are given to the same constituents, with descriptions thereon being omitted.

Also, with the processing flow, removal of step 100 from the processing flow described in FIG. 8 for embodiment 1 produces the same flow of the process for producing a substrate provided with a metal pattern in accordance with embodiment 2.

According to the process for producing a substrate provided with a metal pattern in accordance with embodiment 2, the metal layer 30 can be processed with high accuracy using a low-energy laser light 81 even in the case where the metal layer 30 is directly formed on the substrate 10.

Taking both embodiment 1 and embodiment 2 into consideration, it is seen that the invention can be applied to various production processes without the influence of the underlying layer such as the substrate 10 or the low-reflective layer 20 when the process has a step of forming a metal pattern on the surface of the substrate 10 using the laser light 81. In embodiment 1 and embodiment 2, there is illustrated an example of forming a metal pattern on a glass substrate. In the case where it is necessary to conduct patterning of the metal layer 30 formed on the uppermost layer of the substrate 10 by laser processing, the invention is applicable to various uses.

Next, an example of performing the process for producing a substrate provided with a metal pattern in accordance with embodiment 2 will be described. Hereinafter, Examples 3, 4, 7, and 8 show working examples of the process for producing a substrate provided with a metal pattern in accordance with embodiment 2, and Examples 1, 2, 5, and 6 show comparative examples.

Figure 15:
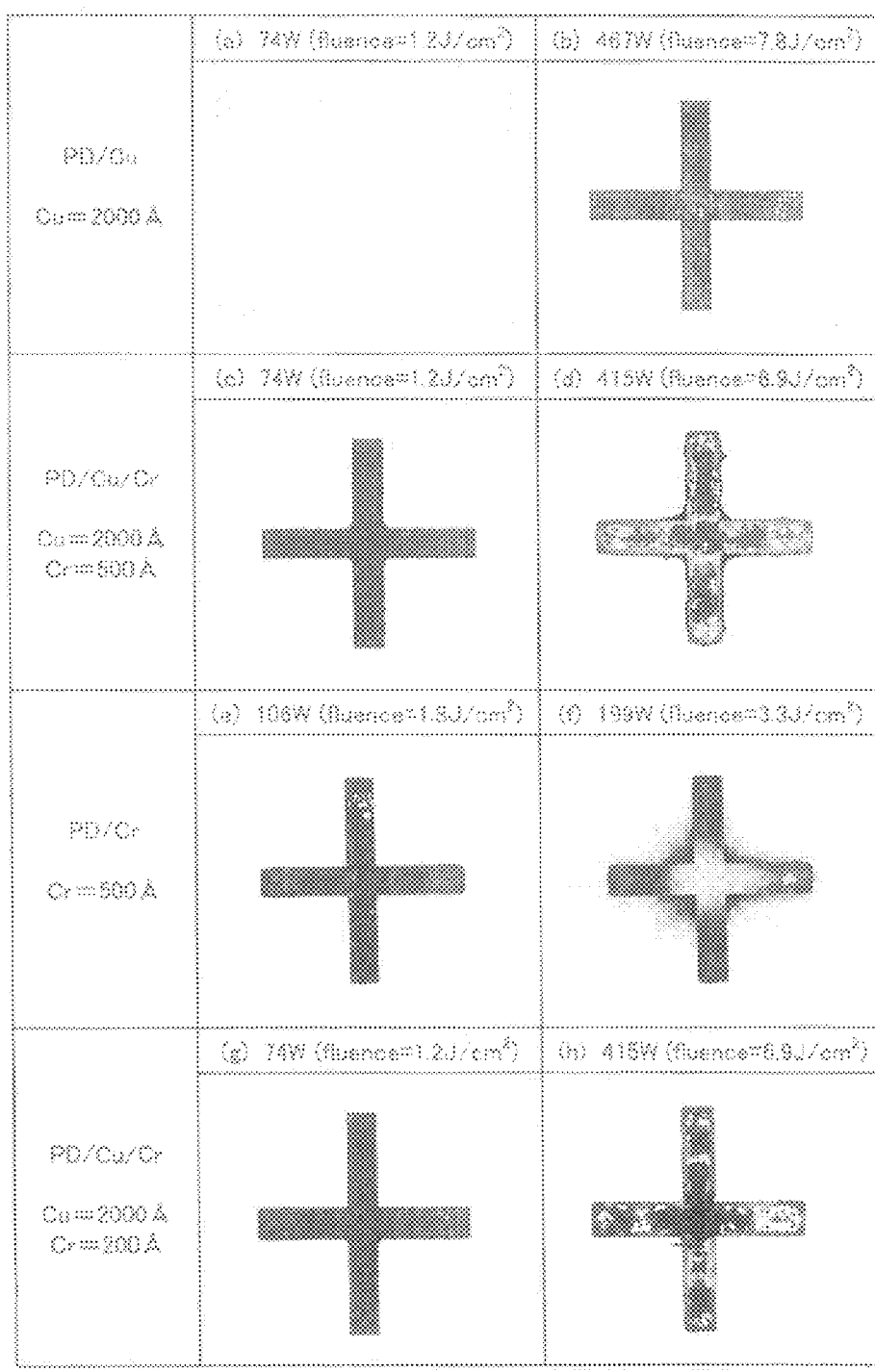
FIG. 15 shows an example of results of conducting the process for producing a substrate provided with a metal pattern in accordance with the embodiment 2.

FIG. 15 shows results of performing the process for producing a substrate provided with a metal pattern in accordance with embodiment 2. Regarding fundamental conditions of the laser light 81 in this example, YAG pulse laser of 1064 nm in wavelength λ was used, with average power being 485 W or less. Also, the fluence (energy amount per unit area) was adjusted to be 8.1 J/cm$^2$ or less. Further, frequency of the pulse laser was 6 kHz, with the pulse width being 40 ns.

FIG. 15 shows the results of performing the process for producing a substrate provided with a metal pattern in accordance with embodiment 2 using such laser light 81 with variously changing the combination of the metal layer 30 and the assist layer 40 and changing the laser power of the laser light 81. Additionally, as the substrate 10, a glass substrate for a plasma display panel was used.

Example 1

Item (a) in FIG. 15 shows the results of Example 1. In Example 1, a metal layer 30 of copper (Cu) was formed on a substrate 10 for plasma display (PD), and laser processing was conducted. The thickness of the copper metal layer 30 was 2,000 Å. It is seen that, even when a laser light of 74 W in power and 1.2 J/cm$^2$ in fluence was irradiated, the single metal layer 30 composed of Cu was not removed at all though the thickness of the layer was comparatively as thin as 2,000 Å, thus no metal pattern being formed.

Example 2

Item (b) in FIG. 15 shows the results of Example 2. In Example 2, laser processing was conducted by increasing the laser power and fluence to 467 W and 7.8 J/cm$^2$, respectively, in comparison with Example 1 of item (b) in FIG. 15. In item (b) of FIG. 15, removed portion 60 of a cross shape was formed, thus formation of a metal pattern being demonstrated.

Example 3

Item (c) in FIG. 15 shows the results of Example 3. In Example 3, the copper metal layer 30 was formed on the substrate 10 for plasma display, and the chromium assist layer 40 was further formed thereon as has been described in embodiment 2. The results of laser processing are shown in item (c) of FIG. 15. Here, the thickness of copper forming the metal layer 30 was 2,000 Å, and the thickness of chromium forming the assist layer 40 was 500 Å. In this case, when processing was conducted by irradiating with the laser light 81 of 74 W in laser power (fluence: 1.2 J/cm$^2$), there was formed a metal pattern in which cross-shaped removed portion 60 was formed with high accuracy as shown in item (c) of FIG. 15. It is seen that, in comparison with the 467 W laser power (fluence: 7.8 J/cm$^2$), much more distinct pattern than shown in item (b) of FIG. 15 was able to be formed in spite of using only 74 W laser power (fluence: 1.2 J/cm$^2$) which was ⅙ or less. Thus, laser processing with high accuracy can be realized with a low power by forming a chromium layer as the assist layer 40 on a main metal layer of the copper metal layer 30 to thereby form the laminate 50.

Example 4

Item (d) in FIG. 15 shows the results of conducting Example 4. In Example, 4 laser processing was conducted by employing the same laminate structure as the structure in item (c) of FIG. 15 and increasing the laser power and the fluence to 415 W and 6.9 J/cm$^2$, respectively. The processing results shown in item (d) of FIG. 15 revealed that processing accuracy is seriously reduced in comparison with the processing results of Example 3 shown in item (c) of FIG. 15 in the straight line properties and the large amount of residues. It is seen from the results that, with respect to the laser light 81, the thing is not that a larger laser power provides better results but that there exists an appropriate range with respect to the laser power.

Example 5

Item (e) in FIG. 15 shows the results of Example 5. In Example 5, a chromium assist layer 40 was formed on the substrate 10 for plasma display, and then laser processing was conducted. The thickness of the chromium layer of the assist layer 40 was 500 Å, and the laser light 81 was irradiated with a laser power of 106 W and a fluence of 1.8 J/cm$^2$. In the following, the results of processing in accordance with embodiment 2 shown in item (c) of FIG. 15 are compared with the results of item (e) of FIG. 15. In item (c) of FIG. 15, the laser light 81 of 74 W in laser power was irradiated to the laminate composed of the 2,000-Å thick metal layer 30 (copper) and the 500-Å thick assist layer 40 (chromium) to completely remove the metal layer 30 and the assist layer 40 in the irradiated portion and form a cross-shaped metal pattern of removed portion 60 with high accuracy. On the other hand, in item (e) of FIG. 15, even when a laser light having a larger laser power than in item (c) of FIG. 15 was irradiated to a chromium single layer having the same thickness as that of the assist layer 40 (chromium) in item (c) of FIG. 15, the chromium single-layer film in the irradiated portion was not completely removed. As is described above, it is seen that, by forming the assist layer 40 (chromium) on the metal layer 30 (copper), patterning can be conducted with high accuracy with a smaller laser power than the laser power necessary for processing the same kind of single layer (chromium) as that of the assist layer 40.

Example 6

Item (f) of FIG. 15 shows the results of Example 6. In Example 6, laser processing of the same single layer film as in item (e) of FIG. 15 was conducted by increasing the laser power and the fluence to 199 W and 3.3 J/cm$^2$, respectively. In order to conduct processing with the same accuracy as in item (c) of FIG. 15, the laser power must be raised to 199 W. Comparison of item (f) with item (c) in FIG. 15 reveals that the laminate film can be processed by a laser power of about ⅓ of the laser power necessary for processing a Cr single layer having the same thickness as the Cr film of the assist layer.

Example 7

Item (g) of FIG. 15 shows the results of conducting Example 7. In Example 7, the results of laser processing by the process for producing a substrate provided with a metal pattern in accordance with embodiment 2 are shown. In Example 3 of item (c) in FIG. 15, the copper film of the metal layer 30 had a thickness of 2,000 Å and the chromium film that was the assist layer 40 had a thickness of 500 Å whereas, in item (g) of FIG. 15, the chromium film of the assist layer 40 had a smaller thickness of 200 Å, though the copper film of the metal layer 30 had the same thickness of 2,000 Å. In this point, Example 7 was different from working example shown in item (c) of FIG. 15.

In item (g) of FIG. 15, a metal pattern having a cross-shaped removed portion 60 was also formed with high accuracy. Comparison of item (g) with items (a) and (e) of FIG. 15 reveals that processing with high accuracy can be conducted with a smaller laser power than that for processing of the copper single film and the chromium single film.

Additionally, the laser power and the fluence were 74 W and 1.2 J/cm$^2$, respectively, which were the same laser power and the same fluence as with item (c) in FIG. 15. As is the same with item (g) in FIG. 15, comparison thereof with item (c) in FIG. 15 which was the example of embodiment 2 reveals that the amount of remaining residues in the cross-shaped end portion was smaller than in item (c) in FIG. 15, with more accurate processing being attained. That is, with regard to the assist layer 40, the thing is also not that a larger thickness provides better results but that there exists an appropriate range with respect to the thickness.

Example 8

Item (h) in FIG. 15 shows the results of conducting Example 8. In Example 8, laser processing was conducted employing the same laminate structure as in item (g) of FIG. 15 and changing the laser power alone to 415 W (fluence: 6.9 J/cm$^2$). In item (h) of FIG. 15, a metal pattern having a cross-shaped removed portion 60 was formed in the laminate 50 composed of copper film and chromium film, but the amount of residues was large and, in view of straight line properties or the like, processing accuracy was seriously reduced in comparison with the case of Example 7 of item (g) in FIG. 15. It is seen from this that the thing is not that a larger laser power of the laser light 81 in this embodiment 2 provides better results but that the laser power is preferably within a given range.

Also, comparing item (h) with item (d) in FIG. 15, item (h) in FIG. 15 shows a more accurate metal pattern. Hence, together with comparison of item (c) with item (g) in FIG. 15, the chromium film of the assist layer 40 having a thickness of 200 Å is better than that having a thickness of 500 Å. Thus, it can be seen that the thing is not that a larger thickness is better, but that a thickness in a given range or a smaller thickness is better.

As has been described hereinbefore using FIG. 15, in the process for producing a substrate provided with a metal pattern according to embodiment 2, when using the chromium film of the assist layer 40, it was possible to process a copper thin film (2,000 Å) with higher accuracy, with a laser power of ⅙ or less compared with that employed conventionally.

Also, with regard to the chromium film of the assist layer 40, by forming the assist layer 40 (chromium) on the metal layer 30 (copper), the laminate 50 was able to be processed with a smaller power (about ⅓) than in the case of processing the chromium film as a single-layer film. This may be attributed to that some special mutual action generates between the assist layer 40 and the metal layer 30.

Besides, in the case of Al/Cr in which aluminum and chromium were used as the metal layer 30 and the assist layer 40, respectively, and Cu/Co in which aluminum and chromium were used as the metal layer 30 and the assist layer 40, respectively, the same phenomena was confirmed.

Thus, it has been found that a combination of appropriately selected metal layer 30 and assist layer 40 to form a laminate 50 can be laser-processed with a smaller laser power than in the case of processing a single-layer of the metal layer 30 or of the assist layer 40, whereby the substrate of the invention provided with the metal pattern can be used for various uses.

Figure 16:
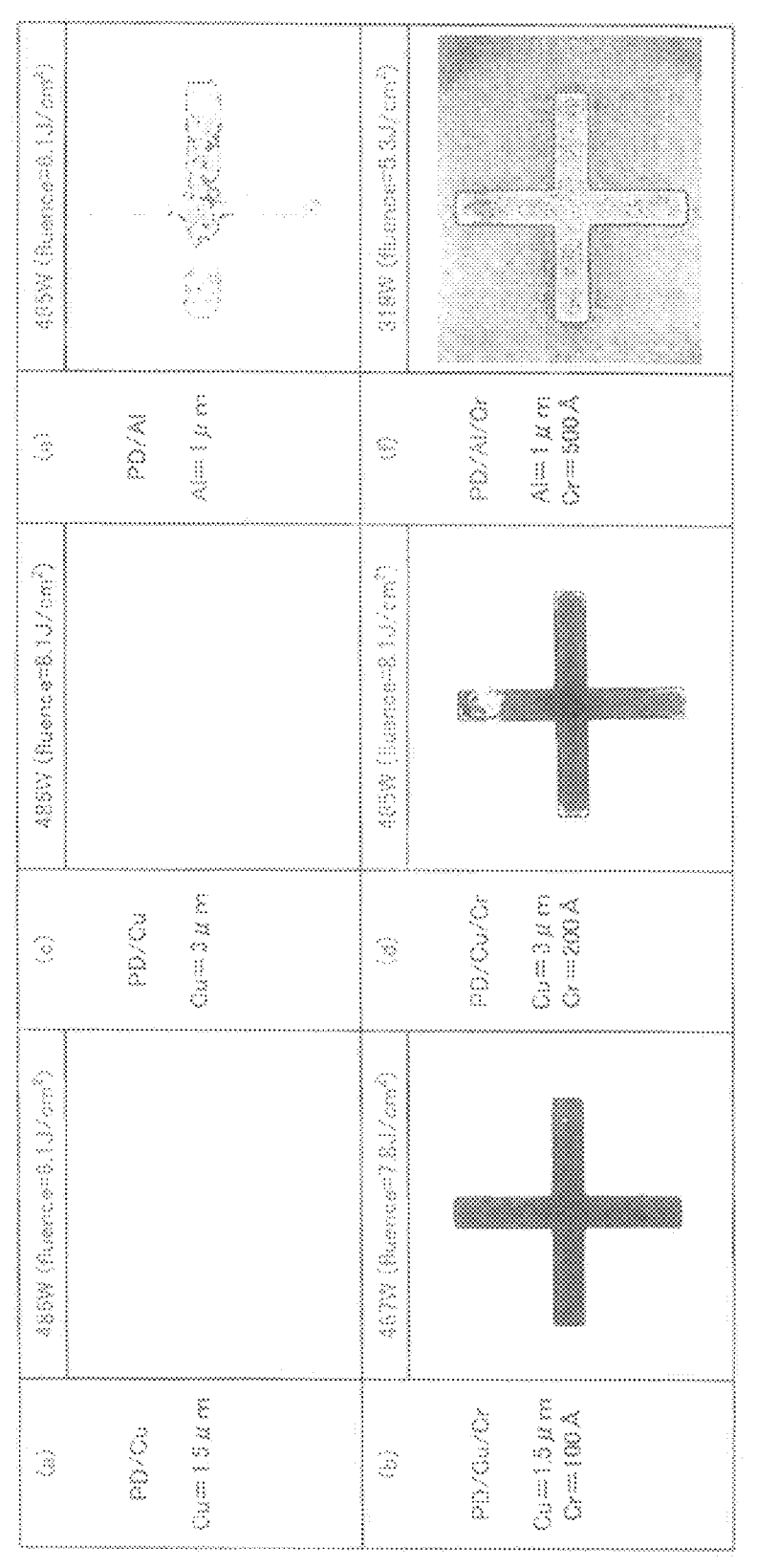

FIG. 16 shows the results of conducting the process for producing a substrate provided with a metal pattern in accordance with embodiment 2 of the invention, in the similar manner as Examples 1 to 8 described above. Hereinafter, Examples 10, 12, and 14 show working examples of the process of producing a substrate provided with a metal pattern in accordance with embodiment 2, and Examples 9, 11, and 13 show comparative examples.

Examples 9 to 14 in FIG. 16 shows the results of the process for producing a substrate provided with a metal pattern in accordance with embodiment 2 and the results of the conventional laser-processing method which was comparative examples, with the metal layer 30 having a thickness of 1 μm or more. Additionally, as the substrate 10, glass substrates for plasma display panel were used in all cases as in Example 1. Also, the fundamental conditions of laser and the laser light source 80 employed therein are the same as in Example 1.

Example 9

Item (a) in FIG. 16 shows the results of Example 9. In Example 9, a copper film was formed as the metal layer 30 on the substrate 10 for plasma display, and laser processing was conducted. The thickness of the copper film was 1.5 μm, laser power was 485 W, and fluence was 8.1 J/cm$^2$. However, the metal layer 30 was not removed, and thus, a metal pattern was not able to be formed.

Example 10

Item (b) in FIG. 16 shows the results of Example 10. In Example 10, there are shown the results of the process for producing a substrate provided with a metal pattern in accordance with this embodiment in which a chromium assist layer 40 was formed on the metal layer 30 in the laminate structure shown in item (a) of FIG. 16, and then laser processing was conducted. In item (b) of FIG. 16, the thickness of the chromium film of the assist layer 40 was 100 Å. It was the same as item (a) of FIG. 16 that the copper metal layer 30 was formed on the substrate 10 for plasma display in a thickness of 1.5 μm.

When the laser-processing step was conducted in this state, there can be formed a metal pattern having a highly accurate cross-shaped removed portion 60 as shown in item (b) of FIG. 16, by using the laser light having a laser power of 467 W and a fluence of 7.8 J/cm$^2$.

Example 11

Item (c) of FIG. 16 shows the results of Example 11. In FIG. 11, a copper film is formed as the metal layer 30 on the substrate 10 for plasma display as in item (a) of FIG. 16, and laser processing was conducted. The thickness of the copper film was 3 μm, namely, the copper film was formed as the metal layer 30 having a larger thickness than item (a) of FIG. 16 on the substrate 10. Although the laser power was 485 W (fluence: 8.1 J/cm$^2$) which was the same as in item (a) of FIG.

16, since the film had a larger thickness than item (a) of FIG. 16, no metal pattern was formed.

Example 12

Item (d) of FIG. 16 shows the results of Example 12. In Example 12, the process for producing a substrate provided with a metal pattern in accordance with this embodiment was conducted with forming a chromium film of the assist layer on the metal layer 30 in the laminate structure shown in item (c) of FIG. 16. In the example of item (d) of FIG. 16, the thickness of the chromium film of the assist layer 40 was 200 Å. Also, the laser light 81 had a laser power of 485 W and a fluence of 8.1 J/cm². When laser irradiation was conducted under such conditions, a metal pattern having a cross-shaped removed portion 60 as shown in item (d) of FIG. 16 was formed. In item (d) of FIG. 16, a portion where removal of the laminate 50 was not complete existed in the upper part of the cross. Although the resulting metal pattern was not complete, the metal pattern was able to be formed in most parts. That is, although laser processing of the single-layer copper film is completely impossible using the same laser power as shown in item (c) of FIG. 16, most parts of the 3-μm thick copper film can be laser-processed by conducting the process for producing the substrate with a metal pattern in accordance with this embodiment. Further, it is considered that irradiation with a little higher power than 485 W (fluence: 8.1 J/cm²) will realize processing with more accuracy.

Example 13

Item (e) in FIG. 16 shows the results of Example 13. In Example 13, an aluminum metal layer 30 was formed on a glass substrate for plasma display, followed by laser-processing. The thickness of the aluminum film was 1 μm, and the processing was conducted using the laser light 81 having a laser power of 485 W and a fluence of 8.1 J/cm². In this case, as shown in item (e) of FIG. 16, removed portion 60 was formed in part of the aluminum film of the metal layer 30 but, as a whole, it was impossible to form a cross-shaped removed portion 60.

Example 14

Item (f) of FIG. 16 shows the results of conducting Example 14. In Example 14, the process for producing a substrate provided with a metal pattern in accordance with this embodiment was conducted with further forming a chromium film of the assist layer 40 on the metal layer 30 in the laminate structure shown in item (e) of FIG. 16. The thickness of the chromium film of the assist layer 40 was 500 Å. Also, the laser light 81 had a laser power of 319 W and a fluence of 5.3 J/cm². When laser irradiation was conducted under such conditions, a metal pattern having a cross-shaped removed portion 60 as shown in item (f) of FIG. 16 was able to be formed.

As shown in items (a), (c), and (e) in FIG. 15, laser patterning of a thick copper film of the metal layer 30 in the form of a single-layer film having a thickness of 5,000 Å or more or of a thick aluminum film of the metal layer 30 in the form of a single-layer film having a thickness of 1 μm or more by the conventional laser-processing process was impossible. However, as shown in items (b) and (f) of FIG. 15, the 1.5-μm thick copper film and the 1-μm thick aluminum film was able to be processed using a laser power within the same range by conducting the process for producing a substrate provided with a metal pattern in accordance with this embodiment.

Also, a copper film having a thickness as large as 3 μm as shown in item (d) of FIG. 15 can be sufficiently processed by raising the laser power to an appropriate level. Additionally, 3 μm is a thickness which satisfies the sheet resistance standard of copper film of plasma display panel. Therefore, it is possible to provide a substrate provided with a metal pattern patterned with high accuracy for use in a transparent electrode-free type plasma display.

Additionally, although not shown in FIGS. 1 to 14, the inventors have also found that a 2,000-Å thick aluminum thin film can be processed with a laser power of ¼ of that in the conventional process by the process for producing a substrate provided with a metal pattern in accordance with the invention. Also, as to the thickness of copper film, it was confirmed that processing of a copper film having a thickness of up to 2 μm can be processed with a power of 485 W or smaller.

Figure 17:
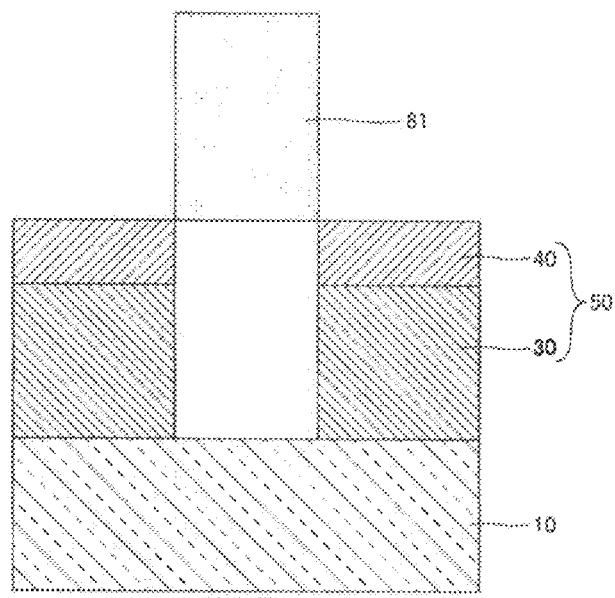
FIG. 17 is a view illustrating the principle of the laser-patterning processing in the present embodiments.

FIG. 17 is a view for illustrating the principle of laser patterning processing of the process for producing a substrate provided with a metal pattern in the present embodiments.

In FIG. 17, a cross-sectional view in which a main metal film of the metal layer 30 and the assist layer 40 are formed on the glass substrate 10 for plasma display panel to constitute the laminate 50 is shown. Here, when the laminate 50 is irradiated with laser light 81, there generates the phenomenon that the laminate 50 is removed with a smaller laser power than in the case of processing a single-layer film. Although various theories may be considered for this phenomenon, it may be considered as follows.

First, when laser light 81 is irradiated to the laminate 50 in a state of being formed on the substrate 10, the temperature of the assist layer 40 increases, and the heat is in turn transmitted to the underlying metal layer 30, whereby the temperature of the main metal layer of the metal layer 30 also increases. Here, the laser power is preferably not too strong and not too weak. An appropriate laser power varies depending upon not only kind of the assist layer 40 but also thickness of the metal layer 30, and hence an appropriate laser power is to be selected in consideration of various factors such as the kind of the assist layer 40 and the thickness of the metal layer 30.

Evaporation of both of the assist layer 40 and the metal layer 30 with the laser power adjusted to an appropriate power level means that energy from the assist layer 40 is absorbed until the metal layer 30 can be evaporated. Conversely, the assist layer 40 absorbs the laser light until the metal layer 30 can be evaporated, with continuously giving energy to the metal layer 30. On the other hand, the assist layer 40 is considered to be influenced by evaporation of the metal layer 30 to form a state of being more easily evaporated. That is, the highly electro-conductive metal to be mainly used for the metal layer 30 is considered to be mostly a metal material having low light absorptivity. On the other hand, the assist layer 40 is generally considered to be composed of a metal material having a high light absorptivity and having a high melting point and a high boiling point.

Thus, the assist layer 40 absorbs the energy of laser light 81 with high light absorptivity, and this energy is in turn transmitted to the metal layer 30. The assist layer 40 sufficiently absorbs the energy of the laser light 81 but, when the energy of laser light 81 is small, sufficient evaporation cannot be attained. Even when the energy of the laser light 81 is large, complete evaporation of the assist layer 40 in the depth direction cannot be attained in a short time in the case where the energy absorbed by the assist layer 40 is converted to heat and the heat is absorbed by the underlying metal layer at a too fast rate.

On the other hand, it is considered that the metal layer 30 itself fails to sufficiently absorb the energy of the laser light 81 due to the low light absorptivity thereof, but can well absorb the heat transmitted from the assist layer 40, and that, when the metal layer 30 is composed of a substance having a comparatively low melting point and a low boiling point, it is easily molten and vaporized to evaporate. Thereupon, the assist layer 40 can be evaporated together with the metal layer 30 with the help of the evaporation power of the metal layer 30. Thus, it is considered that the assist layer 40 becomes more easily evaporatable than in the case of the assist layer alone, which facilitates the laser processing.

Also, in the case where the energy of the laser light 81 is too large, there might result in some cases a poor finish state of the pattern in which the underlying metal layer 30 partially remains. This may be attributed to that the assist layer 40 absorbs a high energy and undergoes a rapid increase in temperature and is completely evaporated before the heat is sufficiently transmitted to the underlying metal layer (to a level at which the underlying metal layer 30 can be evaporated). Therefore, there exists an appropriate range with respect to the energy condition of the laser light 81, which varies depending upon the object to be processed.

Additionally, for easy understanding, the above descriptions have been made based on heat transmission taking the case where the metal layer 30 has a comparatively low melting point and a low boiling point. However, there exists the possibility that the metal layer 30 does not necessarily have a lower melting point and a lower boiling point than that of the assist layer 40.

It may also be considered that some mutual action at an atom level other than thermal transmission exists between the metal layer 30 and the assist layer 40 and that the mutual action accelerates vaporization, eventually both coming into an evaporatable state.

Next, with reference to FIGS. 18 to 20, one example of the use of the substrate provided with a metal pattern produced by the process for producing the substrate provided with a metal pattern in accordance with the present embodiments will be described below.

Figure 18:
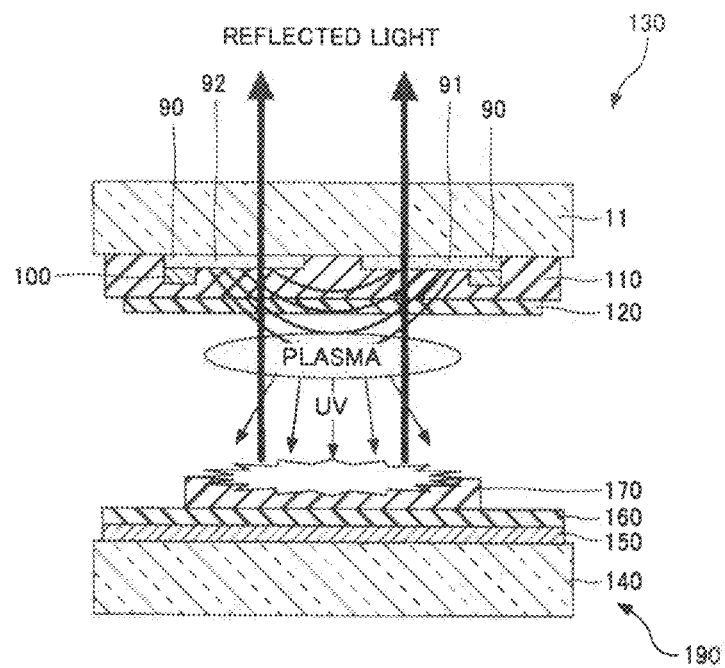
FIG. 18 shows one example of the constitution of a conventional plasma display device.

FIG. 18 shows one example of the constitution of a conventional plasma display device. The conventional plasma display device is provided with a front panel 130 and a back panel 190. The front panel 130 is provided with a front substrate 11, a transparent electrode 90, a bus electrode 100, a dielectric layer 110, and a protective layer 120. The transparent electrode 90 constitutes a scan electrode 91 and a sustain electrode 92. Also, the back panel 190 is provided with a back substrate 140, an address electrode 150, a dielectric layer 160, and a fluorescent layer 170. Also, a discharge gas such as Xe is contained between the front panel 130 and the back panel 190. In the plasma display device, an address discharge is generated between the address electrode 150 and the scan electrode 91 to select a light-emitting cell. Then, a sustain discharge is generated between the scan electrode 91 and the sustain electrode 92 with the light-emitting cell wherein the address discharge is generated. When the sustain discharge is generated, ultraviolet ray UV is generated by the discharge and, when the ultraviolet ray is irradiated to the surface of the fluorescent layer 170, emission of light occurs to perform image display.

Here, transparent electrodes 90 are used for the scan electrode 91 and the sustain electrode 92 of the front panel 130, respectively. As has been described with respect to the problems that the invention is to solve, an attempt is tried to constitute the front panel 130 without using the transparent electrodes 90.

Figure 19A:
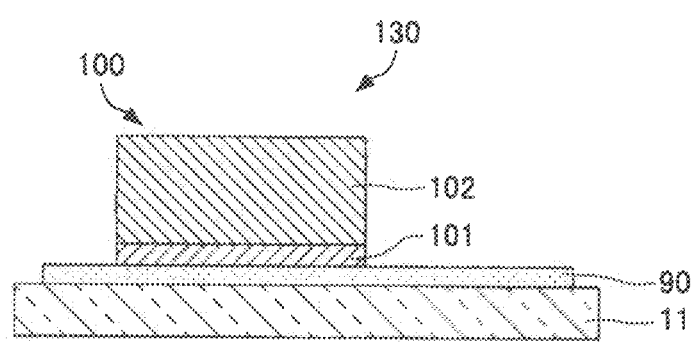
FIGS. 19(a) and 19(b) are partial enlarged views of a front panel 130 of a conventional plasma display panel.
Figure 19B:
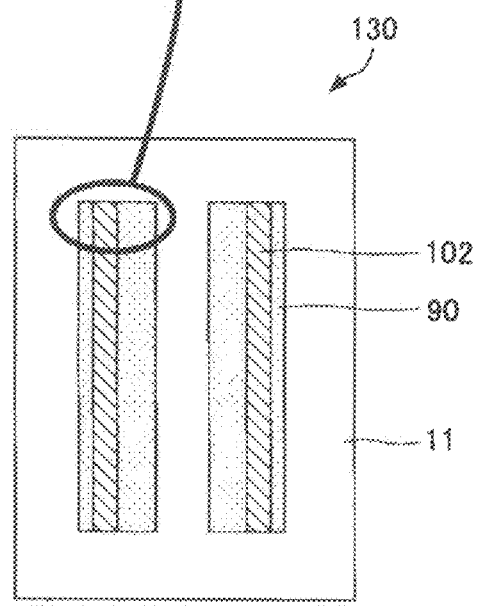

FIG. 19 are partially enlarged views of the front panel 130 of a conventional plasma display panel.

In FIGS. 19(a) and (b), a transparent electrode 90 and a bus electrode 100 are formed on a front substrate 11 composed of a glass substrate. The transparent electrode 90 is formed by, for example, ITO, and the bus electrode 100 is formed by baking a silver paste. With this process, however, it is difficult to form an electrode having a fine shape necessary for sufficiently maintaining an opening. Therefore, there has been found no examples of producing and selling a product produced by applying this technology to FHD.

FIG. 20 show one example of the front panel 131 produced by the process for producing a substrate provided with a metal pattern in accordance with the present embodiments.

Figure 20A:
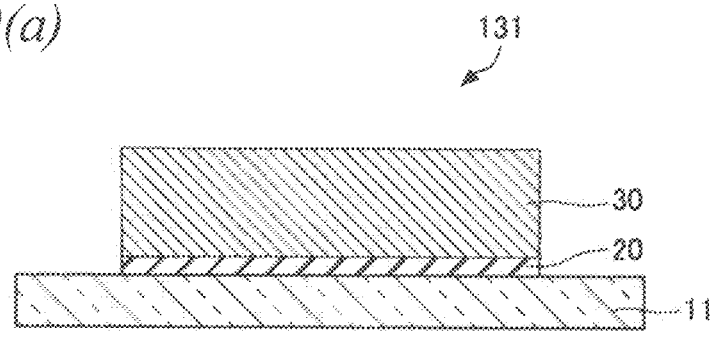
FIGS. 20(*a*) and 20(*b*) show one example of a front panel 131 which is produced by a process for producing a substrate provided with a metal pattern according to the present embodiments.

FIG. 20(a) shows one example of a cross-sectional view of the front panel 131 produced by the process for producing a substrate provided with a metal pattern in accordance with the present embodiment. In FIG. 20(a), a low-reflective layer 20 is formed as a light-shielding membrane on a front substrate 11 composed of a glass substrate. A metal layer 30 constituted by a wiring material such as silver, copper, or aluminum is formed on the low-reflective layer 20. And, on the metal layer 30 is formed, as needed, an assist layer 40 (not shown) composed of chromium or molybdenum functioning as a protective layer.

This can be said to be a substrate provided with a metal pattern produced by the process for producing a substrate provided with a metal pattern having been described with respect to embodiment 1.

Figure 20B:
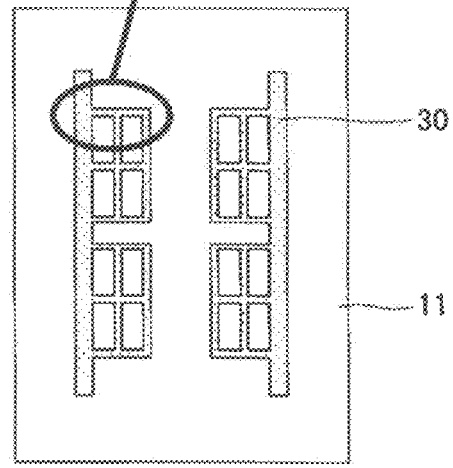

FIG. 20(b) shows one example of a plane view of a front panel 131. In FIG. 20(b), it is seen that the metal layer 30 functions as a bus electrode. In the case of using the metal layer 30 as an electrode, it is necessary to conduct patterning of the electrode with a small area on the front substrate 11 since the metal layer is not transparent.

According to the process of producing a substrate provided with a metal pattern in accordance with this embodiment, the front panel 131 of plasma display device not using any transparent electrode can preferably be produced. Also, beside the front panel 131 of plasma display device, the process can be applied to production of all substrates such as other flat display panels (e.g., liquid crystal) or other substrates with which metal film patterning is conducted by laser processing.

Although the invention has been described in detail and by reference to preferred embodiments, it is apparent to those skilled in the art that the invention is not limited to the above-described embodiments and that it is possible to add various alterations and substitutions to the above-described embodiments insofar as the alterations and modifications do not deviate from the scope of the invention.

While the invention has been described in detail with reference to specific embodiments thereof, it will be apparent to one skilled in the art that various changes and modifications can be made therein without departing from the spirit and scope thereof.

Incidentally, the present application is based on Japanese Patent Applications No. 2010-089595 filed on Apr. 8, 2010 and No. 2011-083193 filed on Apr. 4, 2011, and the contents are incorporated herein by reference.

Also, all the references cited herein are incorporated as a whole.

The present invention can be applied to all substrates with which a metal pattern is formed by laser processing and, for example, it can be utilized for display panels of flat panel display including plasma display panel.

DESCRIPTIONS OF REFERENCE NUMERALS AND SIGNS

10 Substrate
11 Front Substrate

20 Low-Reflective Layer
30 Metal Layer
40 Assist Layer
50 Laminate
60 Removed Portion
61 Pattern Width
70 Mask
80 Laser Light Source
81 Laser Light
82 Energy Distribution
90 Transparent Electrode
91 Scan Electrode
92 Sustain Electrode
100 Bus Electrode
110, 160 Dielectric Layer
120 Protective Layer
130, 131 Front Panel
140 Back Substrate
150 Address Electrode
170 Fluorescent Layer
180 Plasma
190 Back Panel

What is claimed is:

1. A process for producing a substrate provided with a metal pattern, comprising:
preparing a substrate on which a metal layer having a thickness of 200 nm or greater is formed;
forming on the metal layer an assist layer such that a metal laminate comprising the metal layer and the assist layer is formed on the substrate; and
irradiating a laser light on the metal laminate in a pattern such that a laser light-irradiated portion of the metal laminate is removed in the pattern, the metal layer is patterned and a metal pattern comprising a remaining portion of the metal layer is formed on the substrate,
wherein the assist layer comprises a metal material different from a metal material of the metal layer and has a light absorptivity for the laser light different from a light absorptivity of the metal layer.

2. The process for producing a substrate according to claim 1, wherein the assist layer has a higher light absorptivity for the laser light than the light absorptivity of the metal layer.

3. The process for producing a substrate according to claim 1, wherein the assist layer is formed with a thickness smaller than a thickness of the metal layer.

4. The process for producing a substrate according to claim 3, wherein the metal material of the metal layer has 80 atom % or more of copper, aluminum or molybdenum.

5. The process for producing a substrate according to claim 1, wherein the assist layer includes at least one element selected from the group consisting of chromium, cobalt, zirconium, tin, titanium, iron, molybdenum and nickel.

6. The process for producing a substrate according to claim 1, wherein the laser light has a wavelength in a range of from 320 to 1070 nm.

7. The process for producing a substrate according to claim 1, wherein the laser light has an energy density in a range of from 0.3 to 10 $J/cm^2$.

8. The process for producing a substrate according to claim 1, wherein the thickness of the metal layer is 10 μm or less.

9. The process for producing a substrate according to claim 1, wherein the assist layer has a thickness in a range of from 5 to 200 nm.

10. The process for producing a substrate according to claim 1, wherein the substrate is a glass substrate.

11. The process for producing a substrate according to claim 1, wherein the substrate has a low-reflective layer which reduces reflection of light toward the substrate and which is formed between the substrate and the metal layer.

12. The process for producing a substrate according to claim 1, wherein the assist layer forms a protective layer for the metal layer.

13. The process for producing a substrate according to claim 1, further comprising removing the assist layer after the metal pattern is formed.

14. The process for producing a substrate according to claim 1, further comprising forming a low-reflective layer which reduces reflection of light toward the substrate such that the low-reflective layer comprising a metal oxide film is formed between the substrate and the metal layer.

15. The process for producing a substrate according to claim 1, further comprising forming a low-reflective layer which reduces reflection of light toward the substrate such that the low-reflective layer comprising a metal oxide film is formed between the substrate and the metal layer, wherein the metal oxide film of the low-reflective layer includes a metal oxide of Mo or Cr.

* * * * *